US011632211B2

(12) United States Patent
Siomina et al.

(10) Patent No.: US 11,632,211 B2
(45) Date of Patent: *Apr. 18, 2023

(54) METHOD AND APPARATUS FOR MUTING SIGNALING IN A WIRELESS COMMUNICATION NETWORK

(71) Applicant: Telefonaktiebolaget LM Ericsson (publ), Stockholm (SE)

(72) Inventors: Iana Siomina, Täby (SE); Muhammad Ali Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 70 days.

This patent is subject to a terminal disclaimer.

(21) Appl. No.: 17/319,129

(22) Filed: May 13, 2021

(65) Prior Publication Data
US 2021/0266129 A1  Aug. 26, 2021

Related U.S. Application Data

(60) Division of application No. 14/885,261, filed on Oct. 16, 2015, now Pat. No. 11,018,820, which is a
(Continued)

(51) Int. Cl.
*H04L 5/00* (2006.01)
*H04W 64/00* (2009.01)
(Continued)

(52) U.S. Cl.
CPC ............ *H04L 5/0048* (2013.01); *G01S 1/042* (2013.01); *G01S 1/20* (2013.01); *H04L 5/0044* (2013.01);
(Continued)

(58) Field of Classification Search
CPC ..... H04L 5/0048; H04L 5/0044; G01S 1/042; G01S 1/20; H04W 64/00; H04W 74/002
See application file for complete search history.

(56) References Cited

U.S. PATENT DOCUMENTS 6,011,806 A   1/2000 Herring
7,310,379 B2  12/2007 Sibecas et al.
(Continued)

FOREIGN PATENT DOCUMENTS

CN  1926783 A   3/2007
CN  101123465 A  2/2008
(Continued)

OTHER PUBLICATIONS

3rd Generation Partnership Project. "3rd Generation Partnership Project; Technical Specification Group Radio Access Network; Evolved Universal Terrestrial Radio Access (E-UTRA); Physical Channels and Modulation (Release 9)." 3GPP TS 36.211, V9.1.0, Mar. 2010, Sophia Antipolis Valbonne, France, pp. 1-85.
(Continued)

*Primary Examiner* — Md K Talukder
(74) *Attorney, Agent, or Firm* — Coats & Bennett, PLLC

(57) ABSTRACT

A positioning node determines a muting configuration used by one or more base stations for controlling muting of positioning reference signals. The positioning reference signals are transmitted at recurring positioning occasions from the one or more base stations to radio equipment in a wireless communication network. The muting configuration is determined from signaling received from the one or more base stations. The positioning node sends the muting configuration information as higher-layer signaling for receipt by the radio equipment receiving the positioning reference signals. The muting configuration information includes a muting occasion parameter indicating positioning occasions to which muting applies, and each of the positioning occasions comprise two or more consecutive subframes that repeat at a predetermined periodicity.

12 Claims, 7 Drawing Sheets

Related U.S. Application Data continuation of application No. 14/260,553, filed on Apr. 24, 2014, now Pat. No. 9,203,583, which is a division of application No. 12/858,809, filed on Aug. 18, 2010, now abandoned.

(60) Provisional application No. 61/314,724, filed on Mar. 17, 2010.

(51) Int. Cl.
    *G01S 1/04*     (2006.01)
    *G01S 1/20*     (2006.01)
    *H04W 74/00*     (2009.01)

(52) U.S. Cl.
    CPC ......... *H04W 64/00* (2013.01); *H04W 74/002* (2013.01)

(56) References Cited

U.S. PATENT DOCUMENTS

| | | | |
|---|---|---|---|
| 8,730,937 B2 | 5/2014 | Wang et al. | |
| 8,750,887 B2* | 6/2014 | Chandrasekhar | H04L 5/0073 455/80 |
| 2007/0019605 A1 | 1/2007 | Rioux et al. | |
| 2009/0143018 A1 | 6/2009 | Anderson et al. | |
| 2009/0201838 A1 | 8/2009 | Zhang et al. | |
| 2009/0247229 A1 | 10/2009 | Teo et al. | |
| 2009/0249153 A1 | 10/2009 | Zhang | |
| 2009/0286579 A1 | 11/2009 | Warnick et al. | |
| 2009/0313135 A1 | 12/2009 | Dobbelaere et al. | |
| 2010/0202343 A1 | 8/2010 | Hunzinger et al. | |
| 2010/0317343 A1 | 12/2010 | Krishnamurthy et al. | |
| 2011/0039583 A1 | 2/2011 | Frank et al. | |
| 2011/0081917 A1 | 4/2011 | Frank et al. | |
| 2011/0081933 A1 | 4/2011 | Suh et al. | |
| 2011/0105144 A1 | 5/2011 | Siomina et al. | |
| 2011/0230144 A1* | 9/2011 | Siomina | H04L 5/0048 455/68 |
| 2012/0046030 A1* | 2/2012 | Siomina | H04W 24/02 455/423 |
| 2012/0076106 A1* | 3/2012 | Bhattad | H04L 5/0064 370/328 |
| 2012/0165053 A1* | 6/2012 | Yoon | H04L 5/0048 455/501 |
| 2012/0195286 A1* | 8/2012 | Kim | H04L 5/0007 370/329 |
| 2012/0220327 A1* | 8/2012 | Lee | H04W 72/1273 455/509 |
| 2012/0231809 A1 | 9/2012 | Siomina et al. | |
| 2013/0040673 A1* | 2/2013 | Siomina | H04W 56/0015 455/501 |
| 2013/0208677 A1* | 8/2013 | Lee | H04L 1/0078 370/329 |
| 2013/0343315 A1 | 12/2013 | Tiirola et al. | |
| 2014/0233491 A1 | 8/2014 | Siomina et al. | |
| 2016/0043846 A1 | 2/2016 | Siomina | |
| 2016/0212505 A1* | 7/2016 | Morello | H04L 65/61 |
| 2020/0196272 A1* | 6/2020 | Xiong | H04L 5/0053 |

FOREIGN PATENT DOCUMENTS

| | | |
|---|---|---|
| CN | 101645792 A | 2/2010 |
| WO | 2010008897 A1 | 1/2010 |

OTHER PUBLICATIONS

Motorola. "On Serving Cell Muting for OTDOA Measurements." 3GPP TSG RAN1 #57, R1-092628, Los Angeles, CA, USA, Jun. 29-Jul. 3, 2009, pp. 1-7.

Pantech & Curitel. "Muting for LTE Rel-9 OTDOA Positioning." 3GPP TSG RAN WG1 Meeting #58-bis, R1-093793, Miyazaki, Japan, Oct. 12-16, 2009, pp. 1-7.

Motorola. "Autonomous Muting in DL OTDOA." 3GPP TSG RAN meeting #47, RP-100190, Vienna, Austria, Mar. 12-16, 2010, pp. 1-2.

Motorola. "Autonomous Muting Indication in OTDOA Assistance Information." Change Request, 3GPP TSG-RAN Meeting #47, RP-100191, Vienna, Austria, Mar. 16-19, 2010, pp. 1-5.

Ericsson, et al. "Signalling support for PRS muting in OTDOA." Change Request, 3GPP TSG-RAN2 Meeting #70, R2-103413, Montreal, Canada, May 10-14, 2010, pp. 1-2.

Ericsson, et al. "Assistance information for the UE." 3GPP TSG RAN WG1 Meeting #58, R1-093480, Shenzhen, China, Aug. 24-28, 2009, pp. 1-3.

Motorola, "Positioning Subframe Muting for OTDOA Measurements", 3GPP TSG RAN1 #58, Shenzhen, P.R. China, Aug. 24, 2009, pp. 1-9, R1-093406.

Rapporteur (Ericsson), "First version of LPPa protocol specification", 3GPP TSG-RAN WG3 #66, Jeju, Korea, Nov. 9, 2009, pp. 1, R3-093097, 3GPP.

Huawei, "Consideration on positioning support for LTE Rel-9", 3GPP TSG RAN WG1 #56bis, Seoul, Korea, Mar. 23, 2009, pp. 1-6, R1-091257, 3GPP.

\* cited by examiner

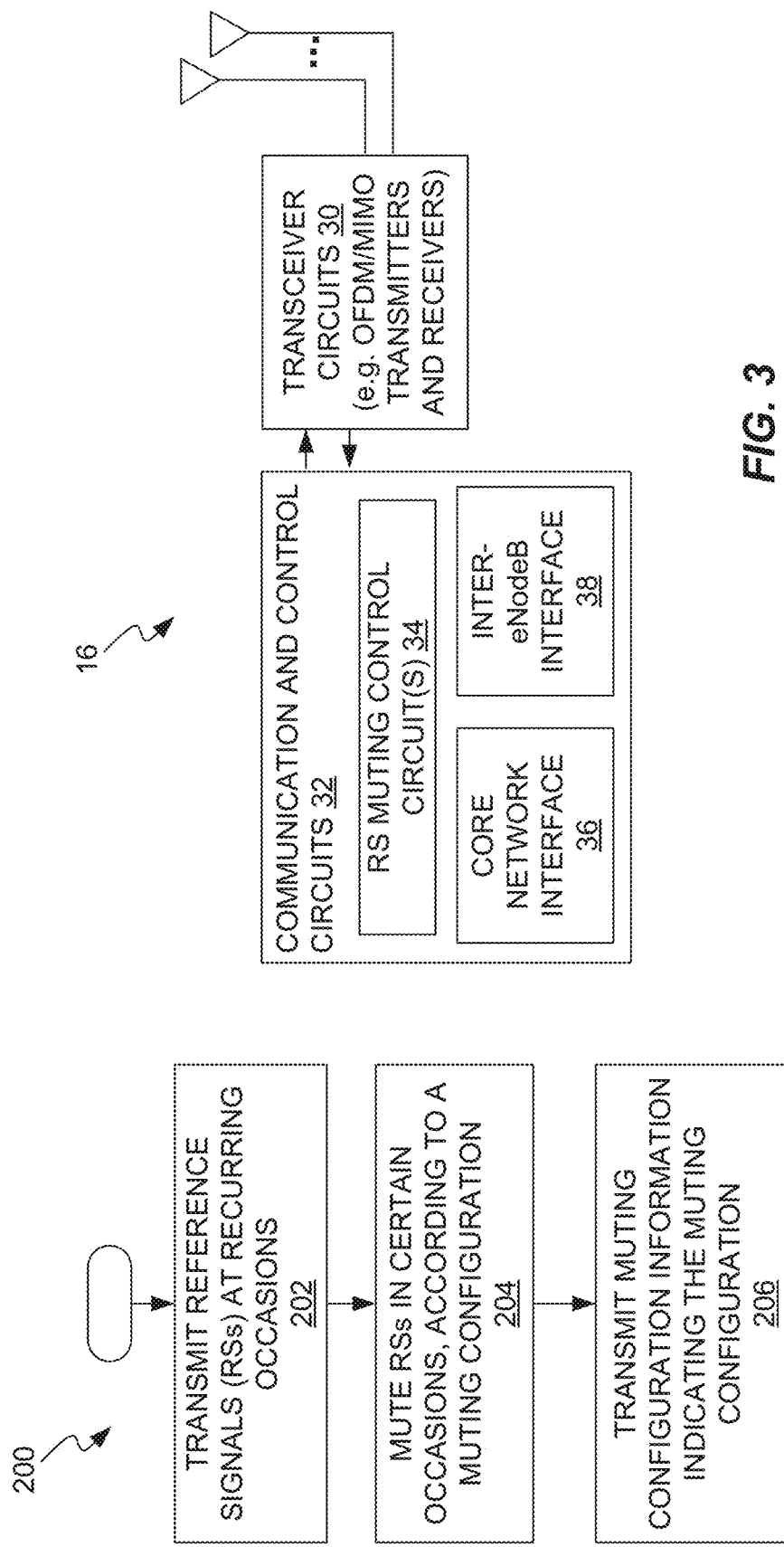

| PRS muting configuration index $I_{MPRS}$ | PRS muting periodicity $T_{MPRS}$ (positioning occasions) | PRS muting offset $\Delta_{MPRS}$ (positioning occasions) | PRS muting subframe offset $\Delta$ (subframes) |
|---|---|---|---|
| $0..(T_1-1)$ | $T_1$ | $I_{MPRS}$ | $\Delta_1$ |
| $T_1..(2T_1-1)$ | $T_1$ | $I_{MPRS} - T_1$ | $\Delta_2$ |
| $2T_1..(2T_1+T_2-1)$ | $T_2$ | $I_{MPRS} - 2T_1$ | $\Delta_1$ |
| $(2T_1+T_2)..(2T_1+2T_2-1)$ | $T_2$ | $I_{MPRS} - (2T_1+T_2)$ | $\Delta_2$ |
| $(2T_1+2T_2)..(2T_1+2T_2+T_3+1)$ | $T_3$ | $I_{MPRS} - (2T_1+2T_2)$ | $\Delta_1$ |
| ... | ... | ... | ... |

*FIG. 10*

METHOD AND APPARATUS FOR MUTING SIGNALING IN A WIRELESS COMMUNICATION NETWORK

RELATED APPLICATIONS

This application is a divisional of prior U.S. patent application Ser. No. 14/885,261 filed 16 Oct. 2015, which is a continuation of U.S. patent application Ser. No. 14/260,553 filed on 24 Apr. 2014, issued as U.S. Pat. No. 9,203,583, which is a divisional of U.S. patent application Ser. No. 12/858,809 filed on 18 Aug. 2010, which claims priority from the U.S. provisional patent application No. 61/314,724 filed on 17 Mar. 2010.

FIELD OF THE INVENTION

The present invention generally relates to interference management in wireless communications networks, and particularly relates to controlling the muting of reference signals transmitted by one or more base stations in the network and signaling related muting configuration information.

BACKGROUND

Wireless communication networks use reference signal transmissions to support a variety of key functions. In this regard, a "reference" signal provides receiving radio equipment with some type of reference information—timing, frequency, phase, etc.—that enables certain measurements by the receiving equipment. For example, cell-specific reference signals, also referred to as common reference signals or CRSs provide receiving radio equipment with a basis for estimating propagation channel conditions. Other physical-layer reference signals include so called positioning reference signals or PRSs, which are particularly contemplated for newer, more capable networks, such as those based on the 3GPP Long Term Evolution (LTE) standards.

Release 9 of LTE, for example, contemplates the use of PRSs to enable and improve the burgeoning host of positioning-dependent services that are or will be offered in such networks. That is, beyond the law enforcement and safety requirements associated with positioning mobile stations and other user equipment, there is an increasing range of positioning-dependent applications and services, all relying on the ability of these newer wireless communication networks to efficiently and accurately support positioning services.

Indeed, the possibility of identifying user geographical location in the network has enabled a large variety of commercial and non-commercial services, e.g., navigation assistance, social networking, location-aware advertising, emergency calls, etc. Different services may have different positioning accuracy requirements imposed by the application. In addition, some regulatory requirements on the positioning accuracy for basic emergency services exist in some countries, i.e. FCC E911 in the U.S.

In many environments, the position can be accurately estimated by using positioning methods based on GPS (Global Positioning System). However, contemporary networks also often have the possibility to assist UEs in order to improve the terminal receiver sensitivity and GPS startup performance (Assisted-GPS positioning, or A-GPS). GPS or A-GPS receivers, however, may not necessarily be available in all wireless terminals. Furthermore, GPS is known to have a high failure incidence in indoor environments and urban canyons. A complementary terrestrial positioning method, called Observed Time Difference of Arrival (OTDOA), has therefore been standardized by 3GPP. Correspondingly, PRSs play a key role in OTDOA measurements.

With OTDOA, the receiving radio equipment measures the timing differences for reference signals received from multiple distinct locations. For each (measured) neighbor cell, the equipment measures Reference Signal Time Difference (RSTD), which is the relative timing difference between a neighbor cell and the reference cell. The position estimate for the receiving equipment is then found as the intersection of hyperbolas corresponding to the measured RSTDs. At least three measurements from geographically dispersed base stations with a good geometry are needed to solve for two coordinates of the receiving equipment and the receiving equipment clock bias.

More particularly, to solve for position, precise knowledge of the transmitter locations and transmit timing offset is needed. Position calculation can be conducted, for example, by a positioning server (eSMLC in LTE) or by the receiving equipment, which often is an item of user equipment (UE), such as a mobile terminal or other type of portable communication device. The former approach is referred to as a UE-assisted positioning mode, while the latter is a UE-based positioning mode. As noted, LTE has introduced the use of new physical signals dedicated for positioning (PRSs), as defined in 3GPP TS 36.211, "Evolved Universal Terrestrial Radio Access (E-UTRA); Physical Channels and Modulation Positioning Reference Signals."

PRSs generally are transmitted from one antenna port from a given base station for a corresponding cell according to a pre-defined pattern. A frequency shift, which is a function of the physical cell identity or PCI, can be applied to the specified PRS patterns, to generate orthogonal patterns and modeling an effective frequency reuse of six. Doing so makes it possible to significantly reduce neighbor cell interference as measured on the PRS for a given cell. Interference reduction on the PRS measurements correspondingly leads to improved positioning measurements.

Even though PRSs have been specifically designed for positioning measurements and in general are characterized by better signal quality than other reference signals, the current LTE standard does not mandate using PRSs. Other reference signals, the earlier mentioned CRSs can, in principle, be used for positioning measurements.

If PRSs are used, they are transmitted in pre-defined positioning subframes grouped by several consecutive subframes, with $N_{PRS}$ subframes in each positioning occasion. The positioning occasions are recurring, e.g., repeated according to a defined periodic interval having a certain periodicity of N subframes. According to 3GPP TS 36.211, the standardized periods for N are 160, 320, 640, and 1280 ms, and the number of consecutive subframes $N_{PRS}$ that define each positioning occasion are 1, 2, 4, and 6.

Because OTDOA-based positioning requires that PRSs be measured from multiple distinct locations, a receiving radio apparatus (user equipment or other radio node in the network) may have to work with a wide range of received signal strengths, e.g., the PRSs received from neighboring cells may be significantly weaker than the PRSs received from a serving cell. Furthermore, without at least approximate knowledge of when particular ones of the PRSs are expected to arrive in time and what PRS patterns are being used (e.g., arrangements within the time-frequency grid of OFDM signal subframes), the receiving radio apparatus is obligated to perform PRS searching within potentially large time-frequency windows. That, of course, increases the processing resources and the time needed for making PRS measurements, and tends to lower the accuracy of the results.

To facilitate such measurements, it is known for the network to transmit assistance data, which includes, among other things, reference cell information, neighbor cell lists containing PCIs of neighbor cells, the number of consecutive downlink subframes that constitute a positioning occasion, and the overall transmission bandwidth used for PRS transmission, frequency, etc.

Further, it is known to mute PRSs, where "muting" means transmitting with zero power (or low power) at certain positioning occasions. Such muting applies to all PRS resource elements—i.e., defined OFDM subcarriers at defined symbol times—within the same subframe and over the entire PRS transmission bandwidth. However, to date, the 3GPP standards do not specify how muting is to be implemented, nor do they specify signaling for communicating muting information to UEs or other receiving equipment that might be making use of the PRSs being transmitted by a given cell or a given cluster of neighboring cells.

Certain muting arrangements, however, have been contemplated. One contemplated approach is to use random muting by cells. Here, each eNodeB decides whether or not to mute its PRS transmissions for a given positioning occasion (or occasions) according to some probability. In the most basic contemplation of this approach, each eNodeB (cell) in the network independently makes muting decisions (according to some defined probability), without any coordination between the cells. The probability used to make the muting decision is statically configured per eNodeB or per cell.

While this approach offers certain advantages in terms of simplicity on the network side, it leaves receiving radio equipment with the same burdensome processing tasks, as said equipment has no knowledge of the random muting operations. A further issue is the inability to know the optimal probabilities to use for making the muting decision, and the fact that such probabilities likely change in dependence on complex interrelationships between cells (varying geometry, etc.), and may even change depending upon times of day, etc.

Another approach relies on a limited set of muting patterns, and maps these patterns according to PCIs. This approach allows a UE or other radio receiver to determine when PRSs are transmitted (or muted) in any given cell of interest, based on receiving information regarding the association between muting patterns and PCIs—e.g., a table. However, this approach requires signaling the actual patterns or hard-coding them into the receiving equipment. That latter approach may not be practical for some types of equipment. Besides, the static nature of such mapping has its own disadvantages.

Another approach proposes sending UEs an indication of whether or not autonomous muting is activated. A Boolean indicator is transmitted for the reference cell and also all neighbor cells as a part of the assistance data. When the indicator is FALSE, the UE can avoid blind detection of PRS muting, optimize detection thresholds and thus improve the positioning performance. However, with the indicator set to TRUE, the UE still does not receive information indicating when and for which resource blocks (RBs) muting occurs, meaning that the UE still needs to blindly detect when PRS muting is used in each cell.

SUMMARY

In one aspect, the present invention provides a simple method of signaling reference signal muting information to receiving radio equipment, such as UEs. (The reference signals may be, e.g., PRSs and/or CRSs.) In one or more embodiments, the present invention proposes a general solution whereby the receiving radio equipment is informed not only on whether muting is used in general in a cell, but also the particular timing and formatting of such muting. Further, the contemplated method provides for the use of dynamic muting patterns, and thus avoids the need for statically defined muting patterns, and provides for coordinated muting control, across two or more network cells.

Accordingly, in one embodiment, the present invention comprises a method of controlling the transmission of reference signals in a wireless communication network. The method includes transmitting reference signals at recurring occasions, for use in making reference signal measurements at receiving radio equipment. The method further includes muting the reference signals in certain ones of the occasions, in accordance with a muting configuration, and transmitting muting configuration information indicating said muting configuration, to inform the receiving radio equipment regarding one or more aspects of said muting.

In particular, the muting configuration information includes one or more of: a bandwidth parameter identifying the portion of reference signal bandwidth to which muting applies; a subframes parameter indicating the number of consecutive subframes within an occasion to which muting applies; and a muting occasion parameter indicating occasions to which muting applies. (In at least one embodiment, in cases where no muting bandwidth parameter is signaled, the receiving radio equipment is configured to assume that muting is applied over the entire reference signal transmission bandwidth.) Such information allows the receiving radio equipment—network node, UE, or other radio apparatus—to know exactly when and how reference signals are muted. In turn, that knowledge provides for improved accuracy in acquiring and measuring reference signals, and for reduced processing complexity through, for example, the elimination or reduction in blind searching.

In another embodiment, the present invention comprises a base station for use in a wireless communication network that transmits reference signals in a wireless communication network. The base station includes a transmitter configured to transmit reference signals at recurring occasions, for use in making reference signal measurements at receiving radio equipment, and a processing circuit that is operatively associated with the transmitter and configured to mute the reference signals in certain ones of the occasions, in accordance with a muting configuration. In particular, the processing circuit is configured to transmit, via said transmitter, muting configuration information indicating the muting configuration, to inform the receiving radio equipment regarding one or more aspects of the muting.

In yet another embodiment, the present invention comprises a method and apparatus in a positioning node that is configured for use with a wireless communication network. The positioning node includes one or more processing circuits configured to determine a muting configuration used to control muting of positioning reference signals transmitted at recurring positioning occasions from one or more base stations in the wireless communication network. In one embodiment, the positioning node determines the muting configuration based on signaling received from the base station(s), i.e., the base stations inform the positioning node as to their muting configuration(s). In at least one such embodiment, the positioning node generates muting configuration information based on the signaling received from the base station(s), and it sends this muting configuration information as higher-layer signaling, to assist radio equipment with measuring the positioning reference signals transmitted from the base stations, in accordance with the muting configurations of those base stations.

In another embodiment, the one or more processing circuits are configured to decide the muting configuration(s) to be used—here, "determining" the muting configurations of the one or more base station(s) means generating the muting configuration information at the positioning node. In at least one such embodiment, the positioning node is configured to send muting control signaling to the base station(s), to effect muting control in accordance with the determined muting configurations.

In either case, the positioning node further includes a communication interface operatively associated with the one or more processing circuits. This communication interface, which may incorporate more than one physical interface and/or signaling protocols, is configured for sending the muting configuration information and/or sending the muting control signaling, and, in applicable embodiments, receiving signaling from the base stations indicating their muting configuration(s). It should be understood that such signaling between the positioning node and the base stations may be direct or indirect.

In at least one embodiment, the one or more processing circuits are configured to generate muting configuration information that indicates when or how muting will be applied by the one or more base stations, for indicated or known positioning occasions. The positioning node sends corresponding muting configuration information as higher-layer signaling, for transmission by the one or more base stations to radio equipment receiving the positioning reference signals.

In another embodiment, a base station is configured to generate the muting configuration and send it to a positioning node. In turn, the positioning node sends this information as assistance data—e.g., the positioning node sends positioning reference signal measurement assistance data to an item of user equipment. The BS then applies the generated muting configuration, i.e., it transmits or does not transmit reference signals accordingly. In this same embodiment and/or others, the base station is equipped with an interface over which the muting configuration is exchanged with other base stations, to provide for distributed coordination of muting configurations.

In another embodiment, the present invention provides a method and apparatus, for controlling measurement of reference signals at a receiving radio apparatus. The reference signals are transmitted by a wireless communication network at recurring occasions, and the receiving radio apparatus is, for example, a UE or another node in the network.

In any case, the contemplated method includes receiving signaling from the wireless communication network that conveys one or more of the following muting parameters: a bandwidth parameter identifying the portion of reference signal bandwidth to which muting applies; a subframes parameter indicating the number of consecutive subframes within an occasion to which muting applies; and a muting occasion parameter indicating occasions to which muting applies. Correspondingly, the method includes controlling reference signal measurement by the radio apparatus, in accordance with the received muting parameters.

BRIEF DESCRIPTION OF THE DRAWINGS

FIG. 2 is a logic flow diagram of one embodiment of a method of muting reference signals in accordance with a muting configuration, and transmitting corresponding muting configuration information.

FIG. 3 is a block diagram of one embodiment of a base station, e.g., an eNodeB in an LTE network.

FIG. 10 is an example table of muting configuration parameter values, which can be used for configuring the muting of positioning reference signals.

DETAILED DESCRIPTION

Figure 1:
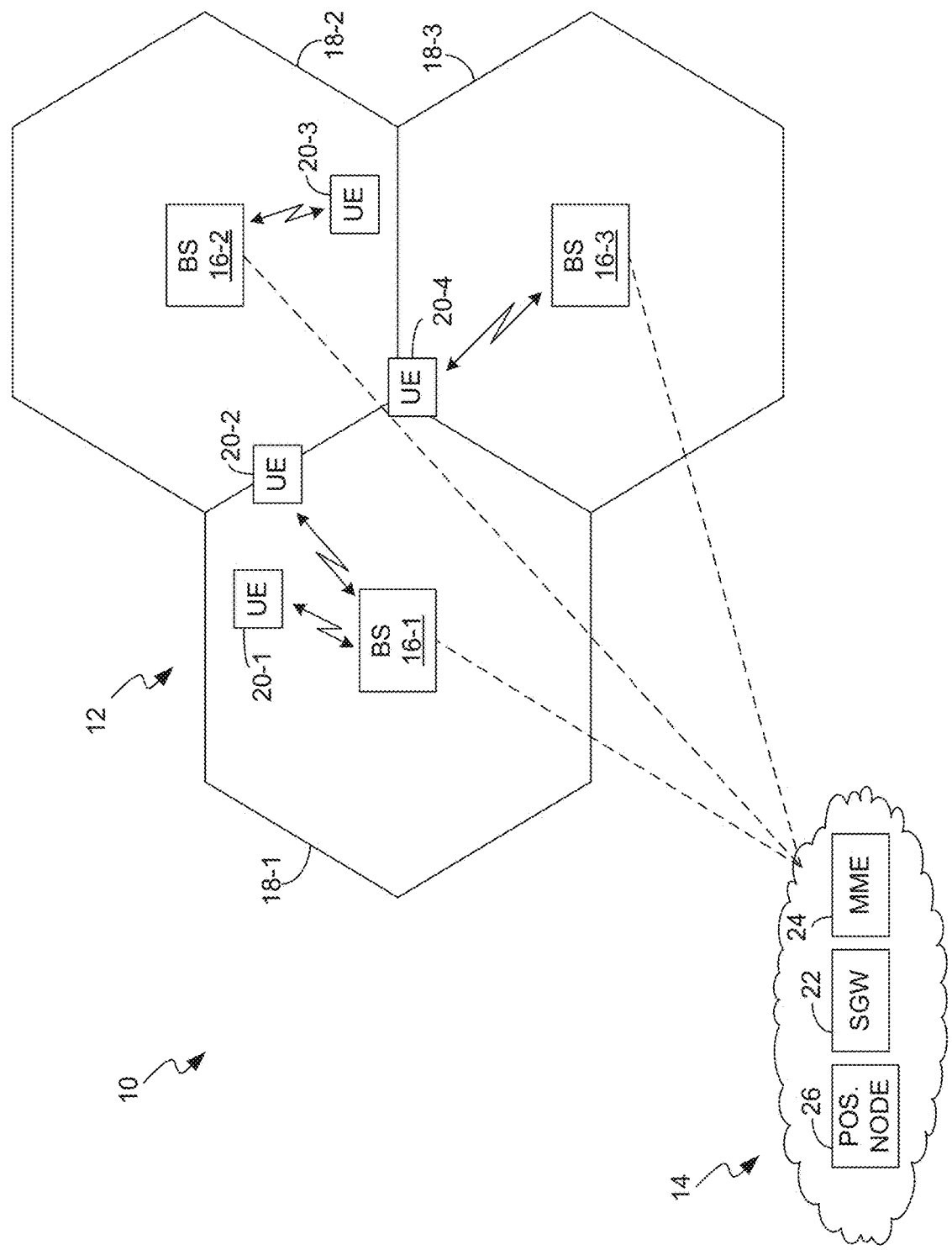
FIG. 1 is a block diagram of one embodiment of a wireless communication network.

As a non-limiting example, FIG. 1 illustrates one embodiment of a wireless communication network 10, which includes a Radio Access Network (RAN) 12 and an associated Core Network (CN) 14. The RAN 12 includes a number of base stations 16, e.g., BS 16-1, 16-2, and so on. Unless needed for clarity, the reference number 16 is used to refer to BSs 16 in both singular and plural senses. Each BS 16 provides one or more "cells" 18, e.g., cell 18-1 corresponding to BS 16-1, cell 18-2 corresponding to BS 16-2, and so on. The cells 18 represent the radio service coverage provided by each BS 16, for supporting communications with user equipment 20, e.g., UE 20-1, UE 20-2, and so on.

Correspondingly, the CN 14 communicatively links the UEs 20 to each other and/or to communications equipment in other networks, such as the Internet, the PSTN, etc. To that end, the CN 14 includes a number of nodes or other functional entities. By way of simplified example, the illustrated CN 14 is depicted as including a Serving Gateway (SGW) 22, a Mobility Management Entity (MME) 24, and a Positioning Node 26. In one or more embodiments where the network 10 comprises an LTE network, or an LTE advanced network, the positioning node 26 comprises an E-SMLC or SLP, or another type of network-based positioning node.

To support positioning operations, e.g., OTDOA measurements, the network 10 in one or more embodiments transmits PRSs at recurring positioning occasions, e.g., at periodic frame/subframe intervals. In the same or other embodiments, the network 10 transmits CRSs at recurring occasions. Correspondingly, in at least one embodiment the present invention provides a method of controlling the transmission of reference signals (RSs) within the network 10 (e.g., within all or a portion of the network).

As shown in FIG. 2, the method 200 includes transmitting RSs at recurring occasions, for use in making reference signal measurements at receiving radio equipment (Block 202); muting the reference signals in certain ones of the occasions, in accordance with a muting configuration (Block 204); and transmitting muting configuration information indicating said muting configuration, to inform said receiving radio equipment regarding one or more aspects of said muting (Block 206). In at least one such embodiment, the muting configuration information includes one or more of: a bandwidth parameter identifying the portion of reference signal bandwidth to which muting applies; a subframes parameter indicating the number of consecutive subframes within an occasion to which muting applies; and a muting occasion parameter indicating occasions to which muting applies.

FIG. 3 illustrates an example embodiment of a base station 16, which is configured to implement method 200, or variations of it. In particular, the base station 16 is configured for use in a wireless communication network that transmits reference signals, and it comprises: a transmitter configured to transmit reference signals at recurring occasions, for use in making reference signal measurements at receiving radio equipment. Here, the transmitter is included in the transceiver circuits 30, which may comprise OFDM (with or without M IMO) radio transmission and reception circuits.

The base station 16 further includes a number of communication and control circuits 32, including a processing circuit operatively associated with the transmitter and configured to mute the reference signals in certain ones of the occasions, in accordance with a muting configuration. Here, the processing circuit comprises, e.g., one or more reference signal (RS) muting control circuits 34, which may be one or more microprocessor based circuits, or other digital signal processing circuits.

In particular, the processing circuit is configured to transmit, via said transmitter, muting configuration information indicating said muting configuration, to inform said receiving radio equipment regarding one or more aspects of said muting, and wherein the muting configuration information includes one or more of: a bandwidth parameter identifying the portion of reference signal bandwidth to which muting applies; a subframes parameter indicating the number of consecutive subframes within an occasion to which muting applies; and a muting occasion parameter indicating occasions to which muting applies.

The base station 16 further includes a core network communication interface 36 for receiving muting control signaling from a higher-layer node in the wireless communication network 10, e.g., from the positioning node 26. Further, the processing circuit is configured to determine or otherwise set the muting configuration of the base station 16, based at least in part on said muting control signaling received from the higher-layer node. In one embodiment, the core network communication interface 36 provides for communicating directly or indirectly with one or more core network nodes, including a positioning node 26, and the base station 16 is configured to receive signaling from the positioning node 26 that sets or otherwise controls one or more aspects of the muting configuration of the base station 16.

As an example, the illustrated base station 16 comprises an eNodeB, where the network 10 comprises an LTE network, or LTE Advanced network. Here, as an example, the muting control signaling received at the base station 16 comprises signaling from an E-SMLC (as the positioning node 26) which controls one or more aspects of the muting configuration of the base station 16.

Further, in at least one embodiment, the base station 16 is configured to transmit, via lower-layer signaling, the previously noted muting occasion indicator as a flag or other indicator indicating whether muting will be used in an indicated or known occasion, and to transmit, via higher-layer signaling, one or both of the bandwidth and subframes parameters, to complement the lower-layer signaling of the muting occasion parameter. This arrangement is advantageous, for example, because it allows lower-overhead signaling of the muting occasion indicator, which may be more dynamic than the bandwidth/subframe details of muting. In any case, such signaling allows for the receiving radio equipment to be apprised of whether muting applies to a given occasion via the muting occasion parameter (via lower-layer signaling), and apprised of the reference signal bandwidth and the number of consecutive subframes (via higher-layer signaling), to which such muting applies for that given occasion.

In other contemplated embodiments, the base station 16 comprises a home eNodeB (e.g., for residential use), a pico base station (e.g., for providing small-cell coverage), or a relay node (e.g., for extending base station coverage). Regardless, in at least one embodiment, the base station includes an inter-base-station communication interface 38 and is configured to determine one or more aspects of the muting configuration cooperatively, with one or more neighboring base stations 16, based on exchanging inter-base-station signaling via the inter-base-station communication interface 38. Of course, as noted, in at least one embodiment, the processing circuit (e.g., RS muting control circuit(s) 34) is configured to determine the muting configuration to be used by the base station 16, and that determination is made autonomously in at least one embodiment.

Returning to the method 200 introduced in FIG. 2, in one or more embodiments, the reference signals (RSs) are positioning reference signals (PRSs) transmitted at defined positioning occasions by at least one base station 16 in the network 10, where the PRSs are used by the receiving radio equipment in making positioning-related measurements.

Further, in at least one embodiment, "muting" the reference signals in any given occasion comprises transmitting the reference signals at zero or reduced power. Here, "reduced" power is a transmit power below that which would be used in the absence of muting, and preferably significantly below the "normal" levels of transmit power used for transmitting references signals when they are not muted.

Still further, in at least one embodiment, the method relates to a plurality of base stations 16 associated with respective ones in a plurality of associated cells 18, and further comprises determining the muting configuration cooperatively across the plurality of associated cells 18. In at least one such embodiment, determining the muting configuration cooperatively across the plurality of associated cells 18 comprises determining one or more muting patterns to be used across the plurality of associated cells 18. Further, in at least one such embodiment, each base station 16 in the plurality of base stations 16 transmits muting occasion indicators, in accordance with the one or more muting patterns. That is, the muting occasion indicators as transmitted are dynamically updated to reflect the muting pattern(s).

Broadly, the method 200 may be carried out, for example, at one or more of the base stations 16 illustrated in FIG. 1, or in an even larger plurality. In at least one embodiment, each base station 16 autonomously determines its muting configuration, and correspondingly transmits muting configuration information. Also, in at least one embodiment, a base station 16 is configured to determine its muting configuration and send signaling to another node that is configured to send signaling that indicates the base station's muting configuration. As one example, the base station 16 determines its muting configuration and sends signaling to a positioning node 26. In turn, the positioning node 26 sends signaling to one or more UEs 20 that indicates the base station's muting configuration. e.g., the positioning node 26 includes muting configuration information in the positioning reference signal assistance data that it sends to the UEs 20 by way of higher-layer signaling that is carried through one or more base stations 16.

In such an embodiment, or in yet another embodiment, two or more base stations 16 exchange muting configuration information—e.g., LTE eNodeBs communicating through their X2 interfaces. In at least one such embodiment, the two or more base stations 16 cooperatively determine the muting configurations to be used by each one of them, or at least share their respective muting configurations with each other. In yet another embodiment, another node (or nodes) in the network, other than the base stations 16, determines at least part of the muting configuration, and the base stations 16 implement that configuration accordingly.

Figure 4:
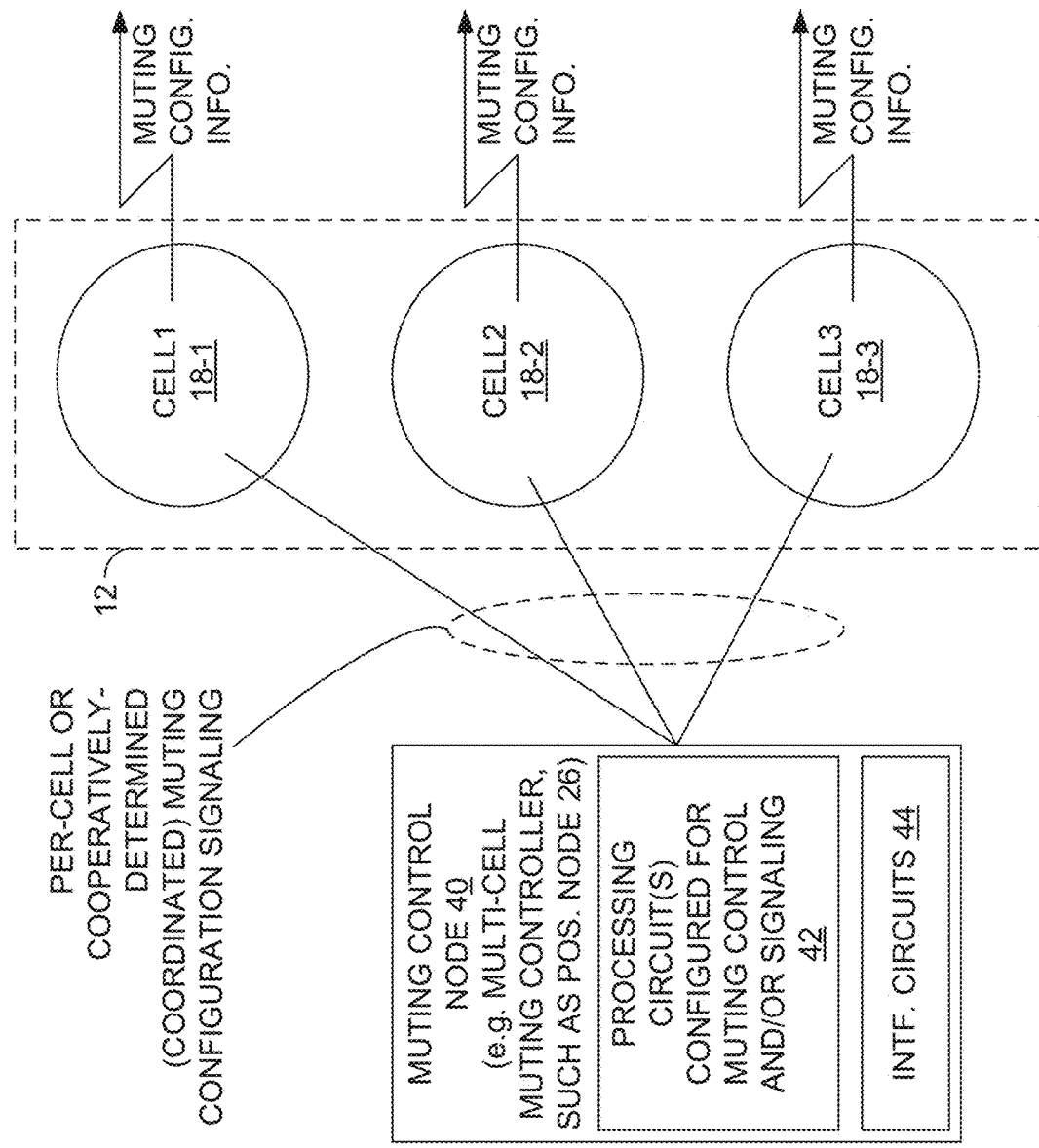
FIG. 4 is a block diagram of one embodiment of a muting control node, that provides muting control for one or more cells in a wireless communication network.

For example, FIG. 4 illustrates a muting control node 40, which may be, for example, the positioning control node 26 shown in FIG. 1. The muting control node 40 is configured to provide per-cell or cooperatively determined muting control (i.e., muting control that is coordinated across two or more cells). In the illustration, the muting control node 40 provides muting control for three example cells, 18-1, 18-2, and 18-3. Notably, the muting control node 40 is, in one or more embodiments, configured to control the muting of one or more types of reference signals that are transmitted in the cells 18, and configured to send (e.g., transparently through the associated base stations 16) muting control information, so that receiving radio equipment is informed of the muting configuration.

The illustrated embodiment of the node 40 comprises one or more processing circuits 42 that are configured to generate muting control signaling for controlling muting of reference signals transmitted at recurring positioning occasions from one or more base stations 16 in the RAN 12 of the network 10. Further, a communication interface 44 is operatively associated with the one or more processing circuits 42 and the processing circuits 42 use the communication interface 44 to send the muting control signaling to the one or more base stations 16.

In at least one embodiment, of the node 40, the one or more processing circuits 42 are further configured to generate muting configuration information that indicates when or how muting will be applied by the one or more base stations 16, for indicated or known occasions, and to send the muting configuration information as higher-layer signaling, for transmission by the one or more base stations 16 to radio equipment receiving the reference signals (e.g., UEs 20 and/or other nodes in the network 10).

Further, as noted, in at least one embodiment, the one or more processing circuits 42 are configured to control muting of the reference signals in coordinated fashion across two or more cells 18 of the radio access network, said two or more cells 18 associated with said one or more base stations 16. In at least one such embodiment, the one or more processing circuits 42 are configured to coordinate, as across the two or more cells 18, at least one of the following: the timing or selection of which reference signal occasions have muting applied to them; the reference signal bandwidth to which muting is applied in one or more (reference signal transmission) occasions; and the number of consecutive subframes to which muting is applied within a given occasion.

Figure 5:
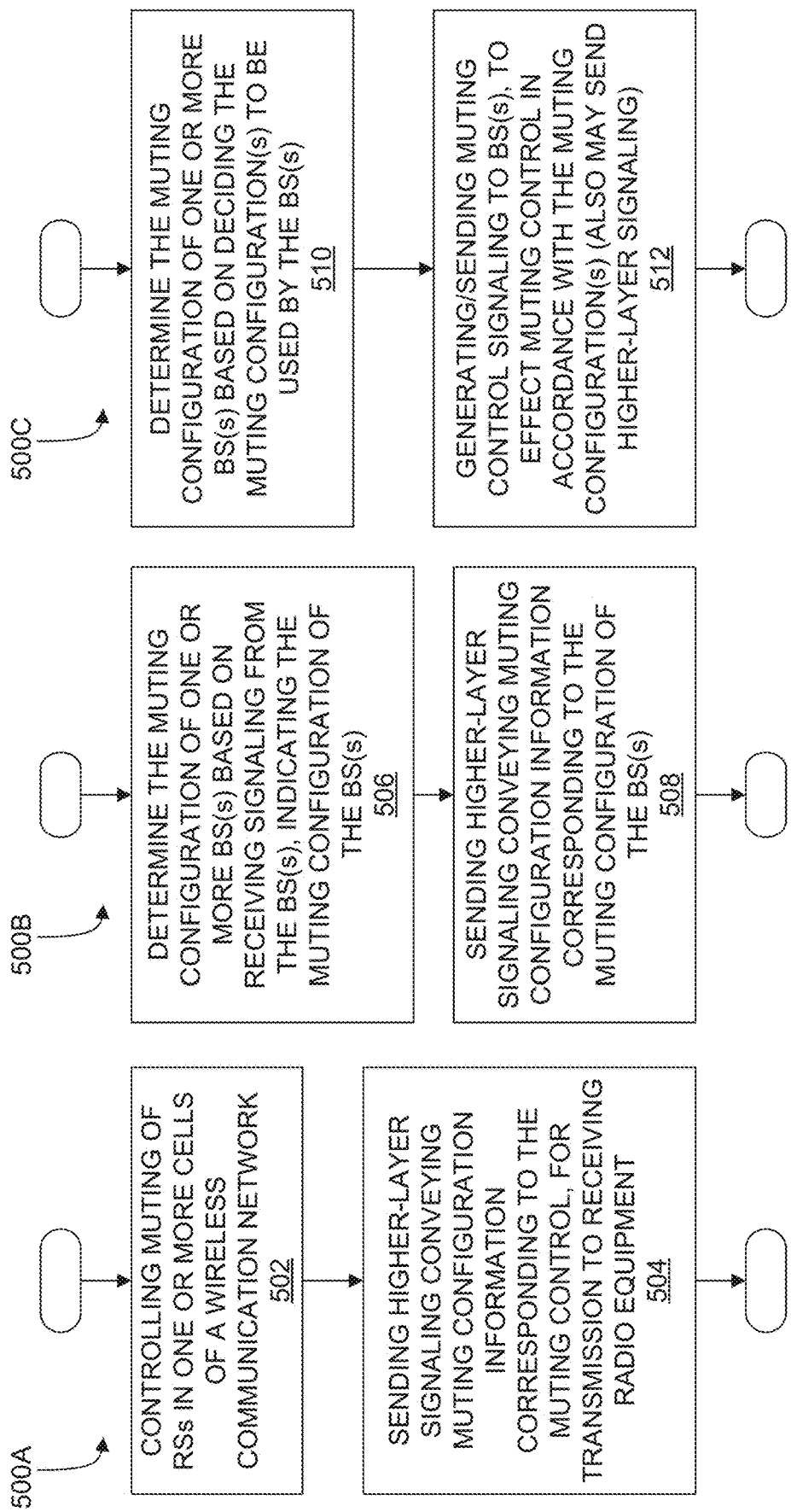
FIGS. 5A-C are logic flow diagrams of various embodiments of a method of determining muting configurations and corresponding muting control, and sending corresponding muting control information.

FIG. 5A illustrates a method 500A implemented, for example, at the node 40, corresponding to the above-described structural configuration of the node 40. The method 500A includes controlling muting of RSs in one or more cells 18 of the network 10 (Block 502)—e.g., a method where a node acts in some centralized sense as a muting configuration controller for the RSs being transmitted in two or more cells 18 in the network 10. The illustrated method 500A further includes sending higher-layer signaling, conveying (at least some of) the muting configuration information, corresponding to the muting control, for transmission to receiving radio equipment (Block 504), e.g., to the UEs 20 operating in the one or more cells 18.

As an example, the higher layer signaling comprises Radio Resource Control (RRC) or LPP signaling. In a particular example, certain aspects of the muting configuration are configured using higher-layer signaling. Example aspects include muting bandwidth information. In at least one such embodiment, other aspects of the muting configuration are signaled using lower-layer signaling, such as physical layer signaling and/or MAC layer signaling. Lower-layer signaling is advantageous, for example, when signaling frequently changing aspects of the muting configuration, such as the muting occasion indicators.

FIGS. 5B and 5C show variations of the method 500A, which may be advantageously carried out at a positioning node 26, such as an E-SMLC in an LTE network. For example, in the method 500B, one sees a positioning node 26 that is configured to determine the muting configuration of one or more base stations 16, based on receiving signaling (directly or indirectly) from the base stations 16, where that signaling indicates the muting configuration(s) of the base stations 16 (Block 506). Correspondingly, the positioning node 26 sends higher-layer signaling conveying muting configuration information (Block 508), e.g., indicating the muting configuration in use at the base station(s) 16. That higher-layer signaling targets radio equipment, e.g., UEs 20, to assist them in making positioning reference signal measurements with respect to the base station(s) 16, in accordance with the muting configuration(s) of the base station(s) 16.

Thus, the method 500B can be understood as an embodiment where one or more base station(s) 16 individually or cooperatively determine their muting configurations while communicating e.g. over the X2 interface, and one or more of them send signaling to the positioning node 26, to inform the positioning node 26 of the muting configurations. Because certain aspects of the muting configuration are advantageously signaled via higher-layer signaling, receiving such signaling from the base stations 16 allows the positioning node 26 to generate corresponding muting configuration information that it then sends to targeted UEs 20 or other radio equipment, to inform those recipients of the muting configuration(s) in use at the base stations 16.

FIG. 5C illustrates an alternative method 500C, where the positioning node 26 determines the muting configuration(s) not based on the base station(s) 16 informing it of the decided configurations, but rather on the positioning node itself deciding the muting configuration(s) to be used by the base station(s) 16 (Block 510). As a non-limiting example, this embodiment is advantageous in implementations where coordination of muting configurations across two or more cells 18 of the network 10 is desired—e.g., a positioning node 26 can provide centralized control and coordination of the muting configurations used by any one or more groups of base stations 16, based on being provisioned with base-station/cell neighbor information, etc.

In any case, the method 500C further includes the positioning node 26 generating/sending muting control signaling to the base station(s), to effect muting control in accordance with the muting configuration(s) decided by the positioning node 26 (Block 512). Note, too, that in one such embodiment, the base stations 16 send all muting configuration information as lower-layer signaling, to assist radio equipment with measuring their reference signals in accordance with the muting configurations. That is, although the positioning node 26 determines all or at least some aspects of the muting configuration(s) used by the base station(s) 16, the base stations themselves generate and send the lower-layer signaling used to convey the corresponding muting configuration to the receiving radio equipment.

However, in another embodiment, the positioning node 26 again decides all or some aspects of the muting configuration(s) to be used by the base station(s) 16. However, the positioning node 26, in addition to sending control signaling to the base stations 16 to implement the muting configuration(s) at those base stations 16, also sends higher-layer signaling to one or more UEs 20 or other receiving equipment. As before, that higher-layer signaling indicates some or all aspects of the muting configuration(s) used by the base station(s) 16.

Figure 6:
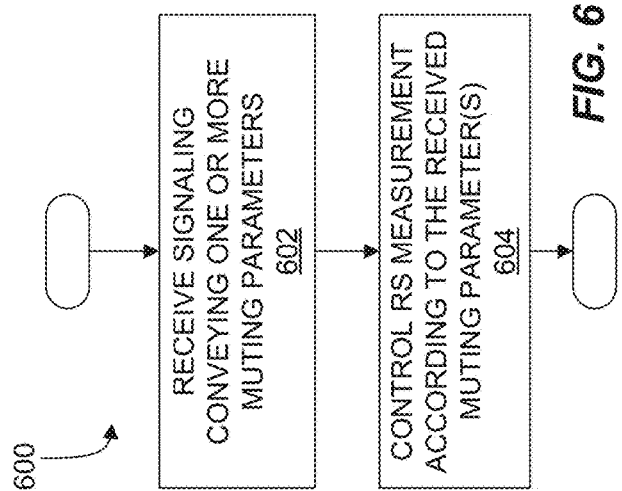
FIG. 6 is a logic flow diagram of one embodiment of a method of receiving muting configuration information (muting parameters) at user equipment or other radio equipment making reference signal measurements, and controlling such measurements according to the received muting parameters.

As for the receiving radio equipment—i.e., equipment that receives the reference signals and acts on the muting configuration information—FIG. 6 illustrates an example processing method 600. The illustrated method 600 includes receiving signaling conveying one or more muting parameters (Block 602). (As previously described, these muting parameters indicate one or more aspects of the muting configuration—i.e., they inform the receiving radio equipment of the muting configuration used to control reference signal muting.) The receiving radio equipment includes processing circuitry that is configured to interpret the received muting control information, and to correspondingly control its reference signal measurements, according to the received muting parameters (Block 604).

Figure 7:
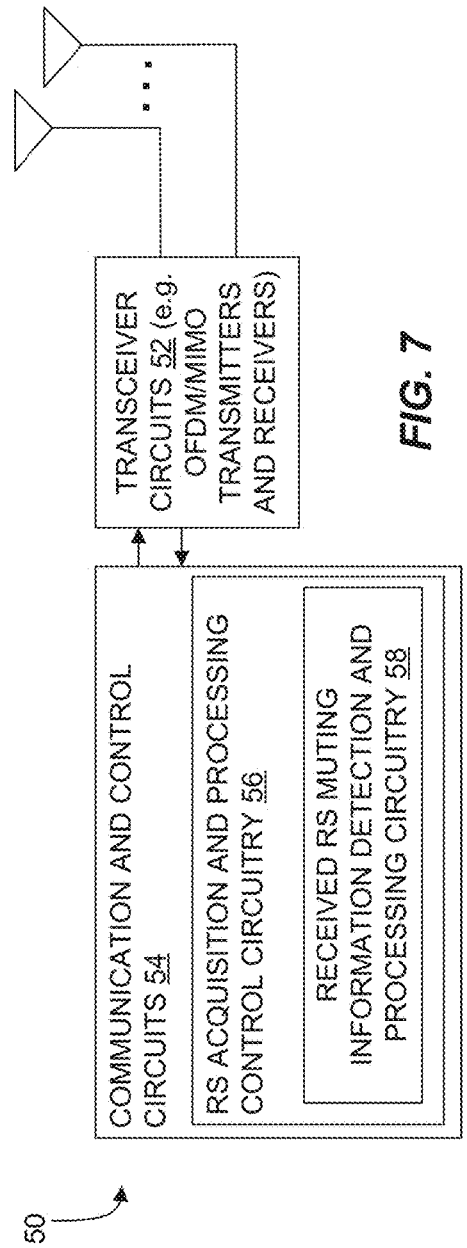
FIG. 7 is a block diagram of one embodiment of a radio apparatus (e.g., UE or other radio equipment) that is configured to receive muting configuration information and to control its measurements of reference signals according to that information.

Correspondingly, FIG. 7 illustrates an example embodiment of receiving radio equipment 50, which may be configured to implement the method 600 of FIG. 6, or variations of that method. The equipment 50 includes transceiver circuits 52, e.g., a wireless communication transceiver comprising MIMO/OFDM transmitter and receiver circuitry for LTE communications. The equipment 50 further comprises communication and control circuits 54, which comprise, for example, fixed and/or programmable circuitry, such as one or more microprocessor-based circuits.

The circuits 54 include reference signal (RS) acquisition and processing control circuitry 56, including received RS muting information detection and processing circuitry 58. With this configuration, the equipment 50 configures one or more aspects of its reference signal measurement operations according to muting control information received from the network 10, via its transceiver circuits 52. For example, it may forego reference signal measurements for certain cells on certain time/frequency resources, based on its knowledge that muting is applied at those times and/or frequencies. Further, it may make more accurate measurements of the received reference signals, based on knowing which time/frequency resources within particular subframes to which muting is applied, and/or based on knowing which cell reference signals are muted, how they are muted, and when they are muted. Note that in one or more embodiments, "muting" a reference signal comprises the transmitting node reducing the transmit power allocated to that signal, where such reduction is potentially significant (e.g., in terms of dBs, as compared to non-muted transmission power). The power offset value or indicator used for such reduction can be signaled.

In at least one embodiment, one or more of the UEs 20 are configured according to the example of FIG. 7. However, it should be understood that other nodes in the network 10 also may be configured to receive muting configuration information, and to control their own acquisition and processing of reference signals according to that received muting configuration information.

Figure 8:
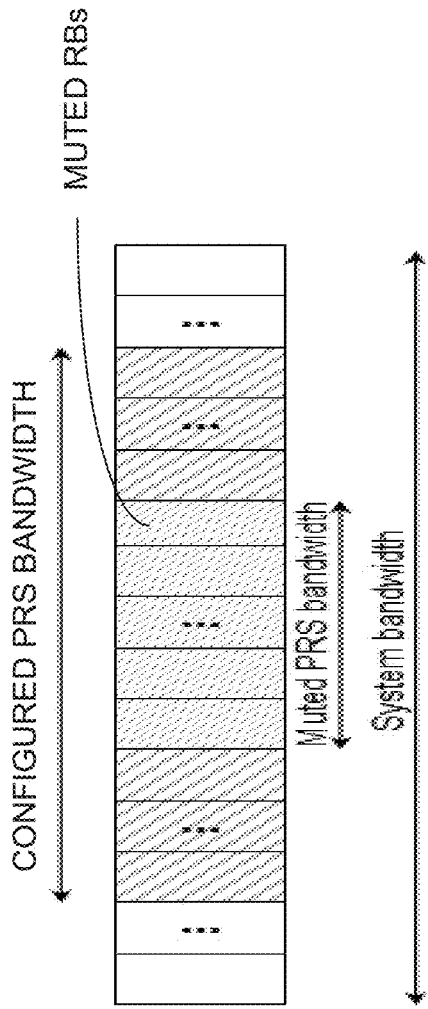
FIGS. 8 and 9 are diagrams illustrating different embodiments for applying muting to a subset of subframes within a given reference signal transmission occasion in which the reference signals span a number of subframes.
Figure 9:
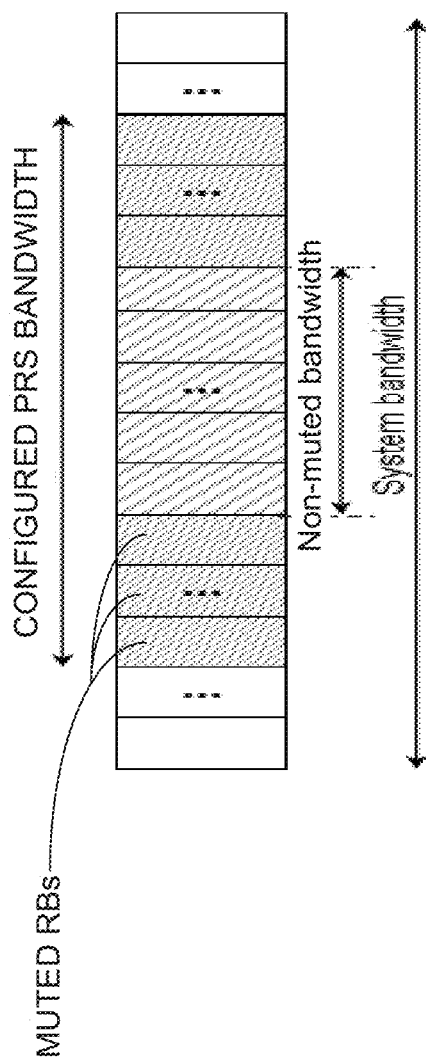

For example, the equipment 50 receives signaling from the network 10 that conveys one or more of the following muting parameters: a bandwidth parameter identifying the portion of reference signal bandwidth to which muting applies; a subframes parameter indicating the number of consecutive subframes within an occasion to which muting applies; and a muting occasion parameter indicating occasions to which muting applies. (Note that FIG. 8 illustrates muting the middle portion of a given reference signal bandwidth, and FIG. 9 illustrates muting the outer portions of a given reference signal bandwidth.) Correspondingly, the equipment 50 controls its reference signal measurements, in accordance with the received muting parameters.

In detailing the possibilities for providing receiving radio equipment with those muting parameters in the context of PRSs, it is contemplated herein to provide UEs 20, and other radio apparatuses that receive and make measurements on the reference signals, with knowledge about the positioning reference configuration in a cell 18 (reference signals to be measured, their transmission bandwidth, subframes for positioning measurements and their periodicity, etc.). This assumption is relevant for the serving cell 18, but also neighbor cells 18 that the UE may have detected blindly (even for reasons other than mobility, i.e., not necessarily for positioning purposes).

As noted, the muting configuration information can be provided using lower-layer signaling, higher-layer signaling, or some combination of lower-layer and higher-layer signaling. As an LTE-based example of lower-layer signaling, prior to every positioning occasion, each eNodeB sends a command or an indicator (e.g. one bit) to the UEs 20 via lower-layer signaling such as in a Medium Access Control (MAC) Protocol Data Unit (PDU), or as a part of the scheduling information, which maps to the Physical Downlink Control Channel (PDCCH). Thus, lower-layer signaling in this example can be understood as some form of control channel signaling, carrying information related to the physical layer (L1) or Layer 2, such as MAC.

In LTE, L1/L2 control information is sent via PDCCH, and UEs 20 are required to decode the PDCCH, which is sent in every subframe, so that the UEs 20 acquire scheduling information etc. In one embodiment herein, it is proposed to send a 1-bit command in each cell 18, via lower-layer signaling, indicating whether muting will or will not be used in the cell 18 during the next positioning occasion. In general, muting configuration signaling may refer by default to an "indicated" positioning occasion, which may be signaled to the UEs 20, or known to the UEs 20, such as based on the UEs being configured to use a default assumption that the signaled muting configuration information pertains to the next positioning occasion.

In an example command configuration, "0" or other such indication means muting is NOT used in the cell 18, in the next occasion and "1" therefore means that muting is used in the next positioning occasion. The opposite logical meanings obviously can be used, or another approach to indicating the used/not-used status of muting for each muting occasion.

However, in one embodiment, each base station 16 is configured to send the command only if the base station's corresponding cell 18 will be muted in the next occasion. Otherwise, i.e., in the absence of the command, the UEs 20 (or other receiving radio equipment) assume that muting will not be used in the cell 18 during the next positioning occasion. Further, the UEs 20 or other receiving equipment may be configured to maintain the assumption that muting is not used, until the reception of the next command indicating that muting will be used.

Advantageously, the UEs 20 or other receiving radio equipment do not have to perform blind detection when muting is used—that is, the knowledge that muting is applied to reference signals during a given reference signal transmission occasion allows the receiving radio equipment to forego blind searching. Eliminating blind detection significantly reduces UE complexity, lowers UE power consumption and decreases UE processing requirements.

In another embodiment, the subframes during which PRSs can be muted within a positioning occasion are known a priori to the UEs 20 and the network 10. For example, if muting is indicated for a given positioning occasion, then the UEs can assume that this applies to all subframes with the indicated positioning occasion. Alternatively, muting may apply only to specific subframes of the indicated occasion. For example, only the first or second half of a given positioning occasion will be muted. Whether the first or second half is muted may be known or otherwise set according to cell IDs, for example.

The above described muting indicator may be a 1-bit command, and serve as a type of ON/OFF signaling. Under low signal quality (e.g. low SNR, high BER, low received power, etc.) the receiving radio equipment may not be able to reliably detect the muting indicator command. This issue may lead a UE 20 or other receiving radio equipment to make a false decision—i.e., an erroneous conclusion about whether muting will or will not be used for a given occasion.

As an advantageous mitigation technique, however, it is proposed herein to configure UEs 20 or other receiving radio equipment to adopt a defined default behavior. For example, under unreliable conditions, e.g., as determined by the UE 20 based on unreliable reception of the muting indicator, or based on other reception quality measurements or indicators, the UE 20 may be configured to assume that muting is not used for the occasion for which the decision is being taken (i.e., the next occasion, or a known future occasion). This configuration has the advantage of detecting and measuring reference signals for the occasion at issue, but also may result in the UE 20 searching for reference signals that are, in fact, muted for the occasion at issue. Thus, an alternate mitigation technique is based on configuring the UEs 20 to assume that muting is used. That is, in cases where a given UE 20 determines that the muting indicator is unreliably received, that UE 20 makes the default determination that muting will be used for the positioning occasion at issue (i.e., the next occasion, or some other known future occasion).

Additionally, the UE 20 is, in one or more embodiments contemplated herein, configured to collect statistics on the unreliably detected muting indication commands over a certain time and report the results to the network 10. In turn, the network 10 is configured to use such information as the basis for determining that the transmit power of the muting indication commands should be increased or decreased. Increasing the power improves reception and thus that decision is taken when the reliability statistics indicate an unacceptably high unreliability. Conversely, decreasing the power reduces inter-cell and intra-cell (if present) interference and that decision thus is taken when the reliability statistics indicate reliability that is better than needed, e.g. by comparing the number or the ratio of erroneous muting commands to a threshold.

Such power control is, in at least one embodiment, implemented at the individual base station 16, where processing circuitry (e.g., the RS muting control circuits 34, shown in FIG. 3) at the base station 16 is configured to evaluate the reliability statistics for muting indicator reception from at least one UE 20, and preferably multiple UEs 20, and to control transmit power increases and decreases based on that evaluation. Note, here, that the transmit power control increases and decreases may comprise increasing or decreasing a variable transmit power ratio. That is, there may be a baseline power control scheme that expresses the transmit power of the muting indicator commands relative to a reference signal (pilot, control, etc.), which is directly power controlled based on reception quality feedback from the UEs 20. In such cases, the base station 16 increases or decreases the transmit power ratio used for setting the power of the muting indicator transmissions, based on the reliability statistics.

As for producing those statistics, at least some of the UEs 20 are configured in one or more embodiments to report the reception reliability results on an event basis, e.g., to send a report if the total number of unreliable commands exceeds a threshold. The threshold may be configured by the network, may be a pre-defined value or may be implementation specifically at the UE 20. Each base station 16 also may be configured to autonomously increase the power of the muting indicator commands, if the reported measurements exhibit large error. Note that an LTE eNodeB, as such a base station 16, could be configured to perform such control in consideration on, e.g., the PDCCH Interference Impact parameter, which is signaled over the X2 interface between eNodeBs.

In one embodiment, when the lower-layer signaling can be decoded by a UE 20 only in the serving cell 18, the network 10 ensures that no other cell 18 included in the assistance data sent by the network 10 mutes during a given positioning occasion for the UE 20. This configuration provides advantages for scenarios when a UE 20 can read low-layer signaling (e.g. control channels) only for its serving cell. In such cases, the muting command only tells the UE that its serving cell (or alternatively, the reference cell) is muted or not. However, at least in some networks, even such limiting muting indications may be enough, because it at least allows the UE 20 to receive muting indications for the presumably strongest interferers—i.e., the reference signals transmitted in the serving or reference cell—and that can be sufficient to improve its measurements of reference signals from other cells. As for the other cells, the UE 20 may be configured to assume (if it has to assume anything) that they are not muted at the times its reference or serving cell is muted and it is left to the network implementation how to ensure that this UE assumption is correct, which is possible by ensuring the separation in time/space of the reference signal muting in neighbor cells. So, in an example implementation, a UE whose reference or serving cell is muted is informed before the muting occurs and it can use that information to make strategic determinations as to when to make measurements for its neighboring cells.

As such assistance data to the UE 20 is typically provided by positioning node 26, e.g. an E-SMLC in the LTE control plane, the positioning node 26 is, in one or more embodiments, configured to coordinate muting control across a set or subset of cells, to accomplish the above-described control. Also, in such cases, the muting indicator informs the UE 20 about muting in the reference cell 18. Note that the reference cell 18 is not necessarily the UE's serving cell 18, but the UE 20 is aware of which cell 18 is considered to be the positioning reference cell 18, based on the positioning assistance information received from the network 10.

Of course, in other embodiments described herein, the UEs 20 receive the muting configuration information based on a combination of lower-layer and higher-layer signaling. Such embodiments allow for (logically) combining the lower layer muting indicator commands with the higher layer signaling, which may be, e.g., radio resource control (RRC), signaling, LTE positioning protocol (LPP) signaling, etc. Such combining enables any given UE 20 to acquire more comprehensive information about the muting applied in any given occasion in any given cell 18. As an example, the lower-layer signaling provides the UE 20 with muting indicator commands, indicating whether or not muting will be applied, while the higher layer signaling indicates the structure or arrangement, or other details, regarding the particular manner in which such muting will be applied. For example, as noted, the higher-layer signaling can be used to indicate which subframes are muted and/or to indicate the particular time and/or frequency resources to which muting is applied. In a specific example, the higher layer signaling conveys information about the muting bandwidth, which is the part of the configured RS transmission bandwidth over which the RS is temporarily not transmitted.

The configuration via higher layer signaling can be done in a semi-static manner, e.g. at a call setup or occasionally during the call. Furthermore the higher layer configuration can be done by the base stations 16 (e.g., by eNodeBs in LTE) or by the positioning node 26 (e.g., an E-SMLC in LTE), or by any other appropriately configured radio node in the network 10.

This arrangement allows the use of higher-layer signaling protocols to be used to carry static or semi-static information about the particular manner in which muting will be applied, while the more dynamic signaling of the muting indicators is done via lower-layer signaling, where those indicators indicate the selective application of muting to given reference signal transmission occasions. In other words, higher-layer signaling can be used to indicate how muting is applied—this can be understood as configuring the reference signal operations of the UEs 20 or other receiving radio equipment, to accommodate the particular structure of reference signal muting that will be used—and lower-layer signaling is then used to indicate when muting is applied.

A specific example comprises using higher-layer signaling to indicate that muting is applied only to the first half of subframes within any given reference signal occasion, or that muting is applied only to the first two subframes within any given occasion, etc. Further, as a refinement of this method, it is contemplated herein that a number of pre-defined muting configurations can be identified, with each such identity identifying a specific subframe muting arrangement, muting bandwidth configuration, etc.

With this approach, the signaling overhead is reduced by signaling the muting configuration ID or IDs, which are known to the UEs 20 or other receiving radio equipment. That is, rather than signaling the actual configuration information, the network 10 signals the muting configuration ID, and the UEs 20 or other receiving radio equipment use that signaled ID to look up the particulars of the muting configuration, such as held in a memory-retained data structure (e.g., look-up table), which stores muting configuration details indexed by muting configuration ID.

Regardless of the particular implementation details for such combined signaling, one advantage using a combination of higher-layer and lower-layer signaling is the flexibility thereby obtained; namely, UEs 20 are informed both about the reference signal occasions to which muting is applied, and further informed about the particular manner in which such muting is implemented, e.g., the subframes and the muting bandwidth that are muted in the involved occasion. Notably, such information can be provided on a per-cell basis, via signaling originating from or otherwise flowing through the base stations 16 that serve the involved cells 18.

Further, using higher-layer signaling, detailed muting configuration information can be sent, e.g., in conjunction with other, related information. For example, in the case where PRSs and positioning occasions are at issue, higher-layer signaling can be used to send positioning assistance information, and to send muting configuration information in conjunction with or as part of that positioning assistance information. As noted, such signaling may occur over logical links between a UE 20 and a positioning node 26, where a logical link may comprise more than one physical link and can be represented, for example, by the LTE Positioning Protocol (LPP). When signaled over LPP, the muting configuration information could be included, for example, as a part of the following information elements: OTDOA-ReferenceCellInfo and OTDOA-NeighborCellInfo, which comprise the OTDOA assistance information for the reference cell and a neighbor cell, respectively.

In addition to communicating muting configuration information to the UEs 20, at least some aspects of the muting configuration are agreed upon between the base station 16 and the positioning node 26. (In an LTE example, such signaling can be done between an eNodeB and an E-SMLC using the standardized LPP Annex (LPPa) protocol.) Depending on where the muting configuration is decided in the network 10 (e.g., at the E-SMLC, or at the eNodeB), the muting information is transmitted either from the base station 16 to the positioning node 26, or in the opposite direction. Further, if the muting configuration is decided in some other part of the network 10, the positioning node 26 and/or the base station 16 are configured to receive that information directly or indirectly from that other node.

Further, the proposed signaling may be implemented in the control plane or in the user plane, and, as noted, the determination of the muting configuration can be determined for or at each cell 18 independent (per cell basis), or determined cooperatively across a number of cells 18, e.g., across given neighboring cells 18. Regardless, each cell 18 transmits the muting configuration information applicable to it. For resource efficiency, however, one or more embodiments contemplate not signaling muting configuration information when muting is, in general, not used within the cell 18. (This is different than the case where muting is in general use within the cell 18, but is selectively applied or not applied to given reference signal occasions.) Correspondingly, UEs 20 that are configured to otherwise receive and process muting configuration information can be programmed or otherwise configured to interpret the absence of muting configuration information from a given cell 18 as meaning that muting is not in use for that cell 18.

Broadly, the present invention proposes one or more methods and apparatuses which avoid the necessity of using a long-term pre-determined, and/or statically fixed muting pattern, and avoids locking the network 10 into sub-optimal pattern variations (such as are imposed by cell-specific randomization of muting). Instead, with the present invention and its ability to efficiently determine, control, coordinate, and signal muting configuration details, the network 10 is free to decide what particular muting configuration is best, at any given time, or for any given area or areas of the network 10. Furthermore, the UE is also informed about the muted PRS and thus has a possibility to optimize the measurement process and achieve better measurement accuracy, at a complexity lower than it would be required without muting signaling.

As contemplated in one or more embodiments, the muting configuration is characterized by at least one of the following parameters or any combination of them: muting bandwidth; the number of consecutive subframes to which muting is applied, and a muting occasion index. In at least one embodiment, the muting bandwidth is the part of the configured RS transmission bandwidth over which the RS is temporarily not transmitted.

In LTE, for example, PRS transmission bandwidth is typically configured with respect to the system bandwidth center, so one embodiment herein applies the same rule for muting bandwidth configuration, i.e. the muting bandwidth parameter indicates a given number X of muted resource blocks (RBs), which are assumed to be located at the center of the PRS bandwidth, and are assumed to be blanked in a given positioning occasion or for a given period. (Refer again to FIG. 8.) If the muting bandwidth is not signaled, the UE may assume that muting is applied over the entire PRS transmission bandwidth.

In principle, there is no limitation on the muted PRS bandwidth, except that it cannot exceed the PRS transmission bandwidth. However, to avoid the centering problem, it makes sense to require that the difference between the system bandwidth and the muting bandwidth is an even number or zero (the same actually applies for the difference between the system bandwidth and the PRS transmission bandwidth).

In one embodiment, it is also possible to mute PRS over the X/2 edge RBs, as taken from each end of the configured PRS transmission bandwidth. This may be achieved, for example, by signaling X with a minus sign. (Refer again to FIG. 9, to see an example of edgewise muting. Note that muting edges of the PRS transmission bandwidth in a short-term may look similar to reducing PRS transmission bandwidth. However, changing the actual PRS transmission bandwidth would require re-transmission of positioning assistance data with the adjusted bandwidth. (Changing back to the original bandwidth would require yet more signaling.) Thus, the muting bandwidth control via the muting parameter is a more efficient approach.

As for the muting parameter indicating the number of consecutive subframes to which muting applies, according to the current LTE standards for PRS, the maximum defined number of consecutive subframes to be used for PRS transmission in one positioning occasion is six. When all these subframes are configured for positioning, it may or may not be necessary to apply muting over the entire positioning occasion. The present invention advantageously allows for the efficient signaling of which particular subframes are muted and/or where muting is applied within a given positioning occasion.

As a default for one or more embodiment, when the number of consecutive muted subframes is not signaled, the UEs 20 are configured to assume that PRSs are muted in the corresponding cell over the entire positioning occasion indicated for muting (no matter how many positioning subframes it spans over). Otherwise, the signaled number shall apply. In any case, in one or more embodiments, one bit is used for this parameter. For example, "0" means that the first $N_{PRS}/2$ set of positioning subframes are muted during the positioning occasion indicated for muting, e.g. the first 3 subframes out of 6 subframes during a positioning occasion having 6 subframes in total. Conversely, a "1" means that second $N_{PRS}/2$ set of positioning subframes are muted during the positioning occasion indicated for muting, e.g. the last 3 subframes out of the 6 subframes. In such embodiments, the PRS muting subframe offset with respect to the first subframe of the positioning occasion is either zero or $N_{PRS}/2$.

As for the muting occasion index, it has been shown in 3GPP RAN4 studies that four positioning occasions are sufficient in most cases for detecting a single cell, even under a pessimistic network configuration (asynchronous network, smallest bandwidth). Thus, as one non-limiting example, the muting configuration can be set so that positioning occasions are muted according to a periodicity of four.

More generally, it is assumed that one out of a larger number of occasions is muted, and that such an arrangement applies to recurring occasions so that the muting periodicity is known. For example, assuming that the muting periodicity spans four occasions, two bits can be used for signaling the muting occasion index, wherein: 00 means muting in the first positioning occasion, 01 means muting in the second positioning occasion, 10 means muting in the third positioning occasion, and 11 means muting in the fourth positioning occasion. If one represents the muting periodicity as $T_{MPRS}$, then one may view the muting occasion index as representing an occasion offset relative to the start of each new muting period. That is, representing the muting occasion index as $\Delta_{MPRS}$, one sees that $\Delta_{MPRS} \in \{0, 1, \ldots, T_{MPRS-1}\}$. With respect to 3GPP TS 36.211, Evolved Universal Terrestrial Radio Access (E-UTRA); Physical channels and modulation, $T_{MPRS}$ is defined as the reference signal periodicity in subframes, and $\Delta_{MPRS}$ indicates the reference signal subframe offset.

Thus, in one embodiment, the muting configuration information signaled from a given cell 18 includes a value for $T_{MPRS}$, which indicates the periodicity of muting—e.g., muting applied every X reference signal occasions—and a value for $\Delta_{MPRS}$, which indicates the particular occasion within the set of occasions spanned by that period to which muting is applied.

Further, while the present invention provides the network 10 with the ability to dynamically adopt or revise muting configurations in individual cells 18, and across groups of cells 18, it still may be desirable to define a limited set of muting configurations and specify them as muting patterns which could be standardized.

Further, it is proposed for one or more embodiments herein to define the RS muting configuration index as various combinations of $\Delta$, $\Delta_{MPRS}$ and $T_{MPRS}$ which satisfy the following equation:

$$(10 \times n_f + \lfloor n_s/2 \rfloor - \Delta - T_{PRS} \cdot \Delta_{MPRS}) \bmod (T_{PRS} \cdot T_{MPRS}) = 0,$$

where $\Delta$ is set to a desired offset value, and $n_f$ and $n_s$ are the system frame number and the slot number within a radio frame, respectively. FIG. 10 depicts a table 1 illustrating examples of tabulated RS muting configuration indexes $I_{MPRS}$, derived under the assumption that muting applies to either the first or the second half of the positioning occasion indicated for muting (i.e. $\Delta$ takes values $\Delta_1$ and $\Delta_2$).

With the above in mind, the present invention in its various embodiments offers a number of advantages. Non-limiting example advantages include: flexible muting configuration with simple signaling; no need for pre-defined PRS muting patterns; reduced UE complexity, processing, power consumption, simultaneous with improved reference signal measurement performance. In part, the reduced UE complexity stems from the need for blind detection at the UE (since the present invention provides the UE with knowledge of when/where muting is used).

Further, as noted, the present invention can be implemented using control-plane based operations, or based on user plane and/or UE operations, or combinations of these approaches. Furthermore, while certain aspects of the present invention have been highlighted in the specific context of PRSs, the present invention is directly applicable to other types of reference signals, which may or may not be used for positioning measurements.

Finally, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A positioning node for use with a wireless communication network, said positioning node comprising:
    one or more processing circuits configured to determine a muting configuration used by one or more base stations for controlling muting of positioning reference signals transmitted at recurring positioning occasions by the one or more base stations to radio equipment in the wireless communication network, the one or more processing circuits being configured to determine the muting configuration from signaling received from the one or more base stations; and
    interface circuitry operatively associated with the one or more processing circuits and configured to:
        receive the signaling from the one or more base stations; and
        send corresponding muting configuration information as higher-layer signaling for receipt by the radio equipment receiving the positioning reference signals from the one or more base stations;
    wherein the muting configuration information includes a muting occasion parameter indicating positioning occasions to which muting applies; and
    wherein each of the positioning occasions comprises two or more consecutive subframes that repeat at a predetermined periodicity.

2. The positioning node of claim 1, wherein the interface circuitry is further configured to send muting control signaling to the one or more base stations, to control positioning reference signal muting by the one or more base stations, in accordance with the muting configuration.

3. The positioning node of claim 1, wherein the positioning node is configured to generate the muting configuration information to indicate when or how muting will be applied by the one or more base stations, for indicated or known positioning occasions, and to send at least a portion of the muting configuration information as higher-layer signaling, for transmission by the one or more base stations to the radio equipment receiving the positioning reference signals.

4. The positioning node of claim 1, wherein the one or more processing circuits are configured to control muting of the positioning reference signals in coordinated fashion across two or more cells of a radio access network, wherein the two or more cells are associated with the one or more base stations, and wherein the muting control signaling sent by the positioning node is configured to effect coordinated muting control across the two or more cells.

5. The positioning node of claim 4, wherein the one or more processing circuits are configured to coordinate, as across the two or more cells, at least one of the following: a timing or selection of which positioning occasions have muting applied to them; a positioning reference signal bandwidth to which muting is applied in one or more positioning occasions; and a number of consecutive subframes to which muting is applied within a given positioning occasion.

6. The positioning node of claim 1, wherein the muting configuration information further includes a subframes parameter indicating a number of consecutive subframes within a positioning occasion to which muting applies.

7. A method, implemented by a positioning node, for use within a wireless communication network, the method comprising:
    determining a muting configuration, used by one or more base stations for controlling muting of positioning reference signals transmitted at recurring positioning occasions from the one or more base stations to radio equipment in the wireless communication network, from signaling received from the one or more base stations; and
    sending muting configuration information as higher-layer signaling for receipt by the radio equipment receiving the positioning reference signals;
    wherein the muting configuration information includes a muting occasion parameter indicating positioning occasions to which muting applies;
    wherein each of the positioning occasions comprise two or more consecutive subframes that repeat at a predetermined periodicity.

8. The method of claim 7, further comprising sending muting control signaling to the one or more base stations, to control positioning reference signal muting by the one or more base stations, in accordance with the muting configuration.

9. The method of claim 7, further comprising generating the muting configuration information such that it indicates when or how muting will be applied by the one or more base stations, for indicated or known positioning occasions, and sending at least a portion of the muting configuration information as higher-layer signaling, for transmission by the one or more base stations to radio equipment receiving the positioning reference signals.

10. The method of claim 7, wherein the muting control signaling coordinates muting of the positioning reference signals across two or more cells of the wireless communication network, wherein the two or more cells are associated with the one or more base stations.

11. The method of claim 10, wherein the muting control signaling is generated to coordinate at least one of the following across the two or more cells: a timing or selection of which positioning occasions have muting applied to them; a positioning reference signal bandwidth to which muting is applied in one or more positioning occasions; and a number of consecutive subframes to which muting is applied within a given positioning occasion.

12. The method of claim 7, wherein the muting configuration information further includes a subframes parameter indicating a number of consecutive subframes within a positioning occasion to which muting applies.

\* \* \* \* \*